F. H. HART.
CURTAIN FASTENER.
APPLICATION FILED JAN. 15, 1920.
1,349,569.
Patented Aug. 17, 1920.
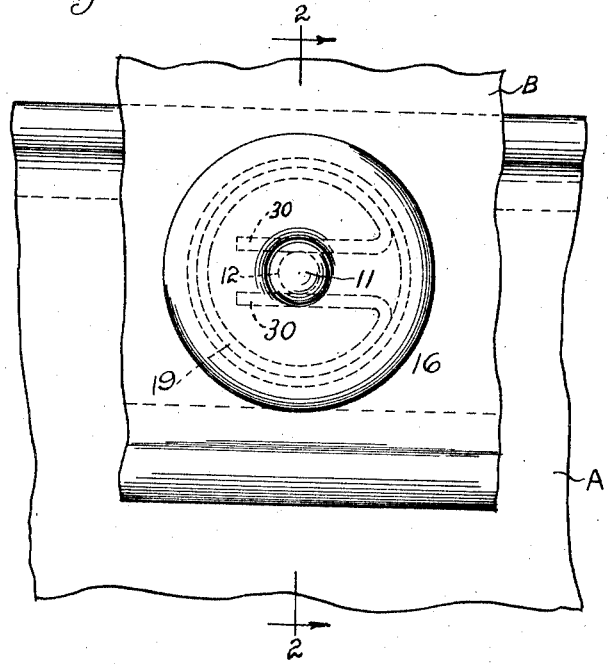
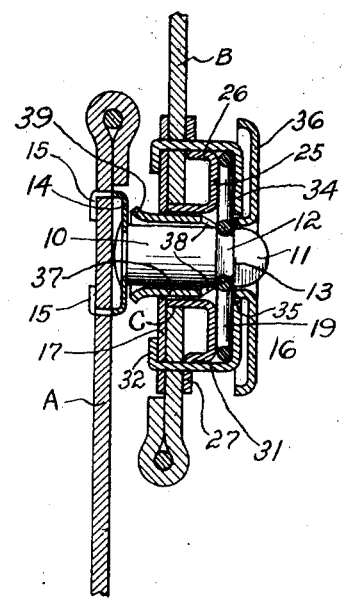
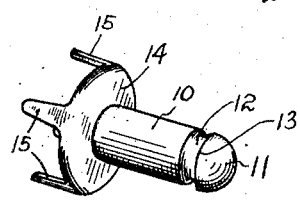
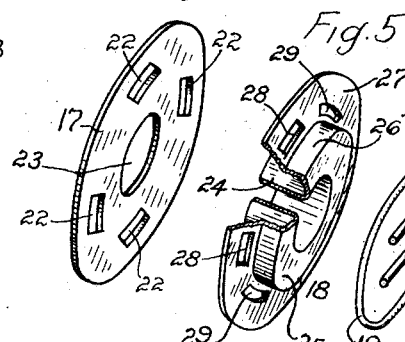
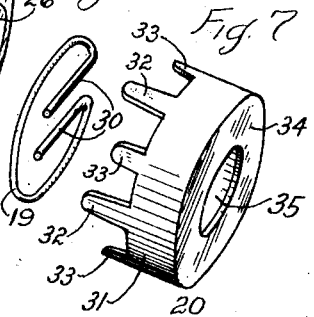
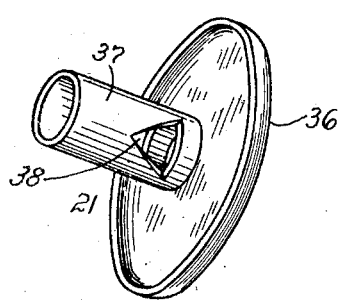
INVENTOR
Franklin H. Hart
BY
A. M. Wooster
ATTORNEY

UNITED STATES PATENT OFFICE.

FRANKLIN H. HART, OF NEW HAVEN, CONNECTICUT.

CURTAIN-FASTENER.

1,349,569.          Specification of Letters Patent.       Patented Aug. 17, 1920.

Application filed January 15, 1920. Serial No. 351,607.

*To all whom it may concern:*

Be it known that I, FRANKLIN H. HART, a citizen of the United States, residing at 210 Howard Ave., New Haven, county of New Haven, State of Connecticut, have invented an Improvement in Curtain-Fasteners, of which the following is a specification.

The object of the invention is to produce an improved snap fastener which may be used in any relation where an ordinary snap fastener is applicable, and one which will be simple of construction, cheap to manufacture, and more efficient and better adapted for its purpose than any heretofore in use. The invention is particularly useful for fastening automobile and carriage curtains.

With the above and other objects in view, the invention comprises the construction, arrangement and combination of parts as hereinafter fully described and as clearly shown in the accompanying drawing.

In the drawing,

Figure 1 is a view of fragments of material held together by my device, and showing said device as viewed from the base of the socket or female member thereof;

Fig. 2 a sectional view on line 2—2 of Fig. 1;

Fig. 3 a perspective view of the stud member, and

Figs. 4, 5, 6, 7 and 8 are perspective views of the several elements of the socket or female member, a portion of the element disclosed in Fig. 5 being cut away to better show its structure.

All of the parts of the improved device are made of metal. Two pieces of material, A and B, are shown carrying the stud and socket members, respectively. In piece B of material is a hole C for a portion of the socket. The stud 10 has a rounded head 11, and a neck 12 adjacent the base of the head, thus providing a circumferential shoulder 13. The base 14 of the stud carries lugs 15 for fastening the stud to piece A of material. The socket or female member 16 consists of a flat disk 17, a shaped disk 18, a spring 19, a connecting member 20, and a covering member 21. The flat disk has a number of spaced apart rectangular holes 22 arranged adjacent its outer portion and a circular hole 23 through its center, all located as clearly shown. The purpose of these holes will be hereinafter described.

The shaped disk is formed from a sheet of metal, and, as shown, comprises a tubular portion 24, a seat 25 for the spring, a ring 26, and a circular flange 27 in which are holes 28 and 29 for a purpose to be described. The spring is bent to a curve and the spaced apart parallel ends 30 thereof are bent back into the curve for a proper distance, as shown. The connecting member consists of a tubular portion 31 having lugs 32 and 33 at one end of the tube and a flat portion 34 at its opposite end. In the flat portion is a circular hole 35, the purpose of which will be described. The covering member consists of an outer portion 36, shaped as shown, and a tubular portion 37, the outer end of which merges into the outer portion 36. At opposite sides thereof tubular portion 37 has triangularly shaped holes therein as shown at 38, the base of the triangle being adjacent to and parallel with said outer portion. At its inner end said tubular portion 37 is flared as shown at 39. The spring 19 is so arranged that the parallel arms 30 rest in said triangles across the bases thereof.

The circular holes in the flat disk and in the flat portion 34, and the tubular portion 24 are all located at the central portions of their respective elements. The holes 22 and 28 are spaced at suitable distances apart and at proper distances from said circular hole 23 and tubular portion 24, respectively, so that they will aline when said circular hole and tubular portion are brought into alinement and the tubular portion 31 is of such dimensions that the lugs thereon will aline with their respective holes. The diameters of the circular holes 23 and 35 are approximately equal, and are also equal to the diameter of the tubular portion 24. The holes 29 on the flange 27 are arranged between the holes 28 thereon and are spaced equal distances therefrom, and lugs 33 are arranged between lugs 32 and at equal distances therefrom.

In assembling the members of the socket, the flat disk is placed on one side of the piece B of material and the shaped disk on the other side, the inner end of the tubular portion 24 thereof passing through the hole C in the material and resting against the flat disk. The spring is placed against the seat 25 of the shaped disk, so that its ends 30 are in line with the opening in tube 24, and the connecting member is slid over the spring and ring 26 of the shaped disk, the flat portion thereof resting on the spring. The lugs 32 are first passed through the rectangular holes 28, then through the piece B of material, and then through the rectangular holes 22 in the flat disk and clamped as shown. The lugs 33 pass through holes 29 and rest against the piece B of material.

The tube 37 of the covering member is inserted through the circular hole in the flat portion of the connecting member, between the parallel ends of the spring, through the tubular portion of the shaped disk and through the circular hole in the flat disk. Its inner end is then flared as shown. The flaring serves two purposes. It holds the covering member to the other elements of the socket, and it provides for easy entrance of the head of the stud. The outer portion 36 is made large enough to completely cover the flat portion of the connecting member. The parallel portions of the spring are seated in the triangular holes of the tube 37 by turning the outer portion of the cover.

The stud is clamped to piece A of material by forcing lugs 15 therethrough and clamping them as shown.

In use, the stud is inserted into the tube 37 through the flared end thereof. The length of the stud is approximately equal to that of tube 37. The arrangement is such that when the stud is inserted its full distance its head will pass just beyond the position of the spring, and the shoulder on said head will comfortably rest against the parallel arms of said spring, as more clearly shown in Fig. 2. It will be seen that a dependable connection and one which will not easily be broken, is thus effected. A slight pull on the stud will not release it for the reason that the parallel arms are pressed by the spring into the neck and beneath the shoulder on the stud, and the seat on the shaped disk and the flat portion of the connecting member effectually hold the spring in position. However, as will readily be apparent, the stud can be removed from its socket by a pull sufficiently strong to force the parallel arms of the spring to ride up the walls of the triangular holes and thus become spread apart sufficiently to release the head.

What I claim is:

1. As an article of manufacture, a snap fastener consisting of a stud and socket, said stud having a circumferential shoulder, and said socket comprising a tubular portion provided with holes having slanting walls, a curved spring having parallel ends which are adapted to rest against the walls of said holes, and means carrying the tubular portion and spring, whereby said parallel ends may be made to ride up on said slanting walls to allow said stud to be released from said socket.

2. As an article of manufacture, a snap fastener consisting of a stud and socket, said stud having a circumferential shoulder, and said socket comprising a tubular portion having triangular holes therein, a curved spring having parallel ends, said parallel ends resting against the outer walls of said triangular holes, and means carrying said tubular portion and spring.

3. As an article of manufacture, a snap fastener consisting of a stud and socket, said stud having a circumferential shoulder, and said socket comprising a covering member, a curved spring with parallel ends, and means for holding said spring in position, said covering member having an enlarged outer portion and a tubular portion flared at its inner end and having triangular holes adjacent its outer end, said parallel ends resting against the walls of said triangular holes.

4. As an article of manufacture, a snap fastener consisting of a stud and socket, said stud having a circumferential shoulder, and said socket comprising a covering member, a curved spring with parallel ends, and means for holding said spring in position, said covering member comprising an enlarged outer portion and a tubular portion flared at its inner end and having triangular holes on the opposite sides of its outer end, the bases of said triangular holes being adjacent to and parallel with said outer portion, and said parallel ends resting against the outer walls of said triangular holes adjacent said bases and parallel therewith.

5. In a device of the class described, a stud having a shoulder, and a socket having a curved spring with parallel ends and carrying a tube for the entrance of the stud, said tube having holes with slanting walls against which said parallel ends are adapted to rest, whereby the parallel ends may be made to ride up on the slanting walls to allow the stud to be released from the socket.

6. In a device of the class described, a stud having a shoulder, and a socket having a curved spring with parallel ends, a seat for said spring, and a tube for the entrance of the stud, said tube having on opposite sides thereof triangular holes against the outer walls of which said parallel ends rest.

7. In a device of the class described, a socket member comprising a flat disk, a shaped disk, a curved spring with parallel ends, a connecting member for said disks and spring, and a covering member, said spring being seated between said shaped disk and said connecting member, and said flat disk resting beneath said shaped disk, and said covering member carrying a tubular portion which passes between said parallel ends and has its inner end flared and its outer end provided with triangular holes.

8. In a device of the class described, a socket member comprising a flat disk, a shaped disk, a curved spring with parallel ends, a connecting member for said disks and spring, and a covering member, said spring being seated between said shaped disk and said connecting member, and said flat disk being beneath said shaped disk, and said covering member comprising an enlarged outer portion and a tubular portion which passes between said parallel ends and has its inner end flared and the opposite sides of its outer end provided with triangular holes the bases of which are adjacent to and parallel with said enlarged outer portion.

In testimony whereof I affix my signature.

FRANKLIN H. HART.